United States Patent

Steuer

[11] Patent Number: 5,913,247
[45] Date of Patent: Jun. 15, 1999

[54] TRANSDUCER FOR A VORTEX FLOWMETER

[75] Inventor: Thomas Klaus Steuer, Dachau, Germany

[73] Assignee: KEM Kueppers Elektromechnik GmbH, Karlsfeld, Germany

[21] Appl. No.: 08/861,028

[22] Filed: May 21, 1997

[30] Foreign Application Priority Data

May 22, 1996 [DE] Germany .................. 196 20 655

[51] Int. Cl.$^6$ .................................................. G01F 1/32
[52] U.S. Cl. ................................... 73/861.22; 73/861.24
[58] Field of Search ......................... 73/861.21, 861.22, 73/861.24, 861.25

[56] References Cited

U.S. PATENT DOCUMENTS

| | | | |
|---|---|---|---|
| 3,759,096 | 9/1973 | White | 73/861.22 |
| 4,831,883 | 5/1989 | Kamenster | 73/861.22 |
| 5,569,859 | 10/1996 | Gatzmanga et al. | 73/861.22 |
| 5,627,322 | 5/1997 | Osterloh | 73/861.22 |

FOREIGN PATENT DOCUMENTS

| | | |
|---|---|---|
| 210 972 | 6/1984 | Germany . |
| 1584353 | 2/1981 | United Kingdom . |

*Primary Examiner*—Harshad Patel
*Attorney, Agent, or Firm*—Evenson, McKeown, Edwards & Lenahan, PLLC

[57] ABSTRACT

A transducer for a vortex flowmeter is used for the volume flow measurement of gaseous, liquid and vaporous media. In order to provide a particularly robust transducer for vortex flowmeters, which is suitable for high and low flow rates of gases, vapours and liquids with high and in particular low densities and is also suitable at high temperatures and high pressures and in the case of contaminated media with a high measurement sensitivity and optimum signal detection, a one-piece vortex body with a sensor integrated therein is to be used. The one-piece, triangular or trapezoidal vortex body is provided with vertical recesses in the vicinity of its tapering side walls, so as to form a compact vortex generation area, a vortex determination area and a vortex detection area as the minimum rigidity area.

16 Claims, 3 Drawing Sheets

TRANSDUCER FOR A VORTEX FLOWMETER

FIELD OF THE INVENTION

This invention relates to a transducer for a vortex flowmeter having a baffle barrier for vortex generation, a scanning element for vortex determination which is positioned downstream and connected to the baffle barrier, and a sensor for detecting the measurement test signals.

DESCRIPTION OF THE PRIOR ART

Vortex flowmeters are used for volume flow measurement of gaseous, liquid and vaporous media for optimizing technical processes, particularly in the chemical, water and power supply industries.

The operating principle of the vortex flowmeter is based on a vortex formation brought about by a vortex body placed in a measuring tube. This vortex body, which is also known as a baffle barrier, is placed in the measuring tube in such a way that its leading side is perpendicular to the flow direction. If a medium flows through the vortex flowmeter, then on flowing round the vortex body vortices are alternately generated on its contour. In order to be able to precisely geometrically define the location of vortex formation, the contour can be provided with so-called separating edges. These vortices form downstream a regular vortex street known as a Karman vortex path. As a result of the vortices flowing by and the pressure differences which occur, an alternating force is exerted on a back part, which is generally plate-like and is also called a sampling or scanning plate. The alternating sinusoidal oscillations of the scanning plate change with the vortex frequency, which is in turn dependent on the flow rate of the medium to be measured. In other vortex frequency flowmeter constructions the vortices which occur are detected by thermistors, pressure sensors, strain gauges, capacitive sensors or by ultrasound.

East Germany patent 210 972 discloses a transducer for a vortex flowmeter, which comprises a baffle barrier for vortex generation and a back part for vortex determination. The baffle barrier is built in two parts and apart from an upstream leading plate with a step-like taper has separating, contracting and trailing edges. The back part for vortex determination comprises two stabilizing plates and a sampling plate located between them. The arrangement and construction of an electromechanical converter generally used for such transducers are not disclosed.

As a result of the back sampling plate connected and in particular welded to the vortex body, the known transducer for a vortex flowmeter is relatively fault-prone. In addition, due to the relatively complicated baffle barrier construction, manufacture is costly and in practice it is difficult to ensure a constant dimensional stability of the geometry in the case of series production. The necessary requirements are also not always satisfied with respect to the stability against high loads through the medium to be measured, e.g. high pressures, temperatures and flow rates, in the case of the known transducer.

SUMMARY OF THE INVENTION

The object of the invention is to provide a particular robust transducer for vortex flowmeters, which is suitable for both low and high flow rates of gases, vapours and liquids and at high temperatures and high pressures, as well as with contaminated measurement media and measurement media with low and high densities and which still ensures a high measurement sensitivity and a good signal-to-noise ratio with optimum signal detection.

According to the invention this object is achieved in that the baffle barrier is constructed as a vortex generating area and a sampling plate as a vortex determination area in a one-piece vortex body, that the one-piece vortex body has a virtually triangular or trapezoidal cross-section, that the vortex generating area and vortex determination area, as well as a vortex detection area are formed by at least one vertical recess in longitudinal sides of the vortex body and that at least one sensor is positioned in or close to the vortex detection area and is integrated into the vortex body.

It is important for a vortex frequency flowmeter to find a disturbing or interfering body geometry, which has a high proportionality range between the vortex separation frequency and disturbing body geometry.

Mathematically this relationship is described by the Strouhal number St:

$$St = \frac{f \cdot d}{V_0}$$

in which
 f=vortex separation frequency
 d=leading body diameter
 $V_0$=free stream velocity.

In an ideal disturbing body said Strouhal number is constant over a large range as a function of the Reynolds number Re (dependent on the flow rate, density, viscosity, diameter).

The fundamental idea of the invention is to use a vortex body, which has a roof-shaped, elongated construction and an almost triangular or trapezoidal cross-section. The vortex body is provided with an integrated sensor, particularly a piezoelectric element and has on its longitudinal sides inclined in the flow direction in each case one recess, through which the vortex body is subdivided into several zones or areas, but at least into a vortex generation area, a vortex determination area and a vortex detection area.

The vortex generation area is a compact area of the one-piece vortex body and emanates from a leading side, which is perpendicular to the flow direction.

The leading side forms the base of the cross-sectionally triangular or trapezoidal, one-piece vortex body. It is the horizontal cross-section in a largely vertically positioned disturbing body, whose rectangular base consequently has vertically positioned longitudinal sides. Virtually centrally and parallel to the leading side are provided slots or recesses, preferably over the entire length of the longitudinal sides. In the area of these recesses the inventive, one-piece vortex body has the minimum stiffness, so as to bring about an optimum signal detection with a sensor located in said area.

To the vortex detection area formed by the longitudinal side recesses, is connected at the rear or upstream the vortex determination area, which is significantly narrower than the vortex generation area. The forces of the pressure differences of the vortices acting on the vortex determination area are transferred as mechanical loads to the vortex detection area. The electromechanical sensors located in the vortex detection area can now convert the mechanical loads into an electric signal. The vortex determination area extends over virtually the same height as the vortex generation area and the vortex detection area. This offers the possibility of an areal scanning or sampling of the vortex street formed on the front separating edges.

The inventive construction of an one-piece vortex body permits the positioning of a sensor in the immediate area of the vortex detection area and/or vortex determination area, which leads to an extremely high measurement sensitivity and at the same time a good signal-to-noise ratio.

In the case of vortex flowmeters for large nominal widths, e.g. for DN 50 to 300, the sensor, e.g. a piezoelectric element, can be so placed in the vortex detection area, that the sensor extends in virtually equal parts into the vortex generation area and into the vortex determination area.

With vortex flowmeters for smaller nominal widths, e.g. for DN 10 to 40, the sensor can be positioned immediately adjacent to the vortex detection area, but in the relatively compact vortex generation area. This allows an optimum vortex detection by one or more sensors.

Important for a particularly high vibration insensitivity is the large surface of the vortex determination area, i.e. of the rear area, so that there is a particularly high force action of the vortices on the sensor system integrated into the vortex body.

As a result of the design of the vortex determination area a surface is obtained on which the forces of the vortices can act. As a result of the areal scanning of the vortices there is a mathematically integrating action of the signal detection. This has the particular advantage that disturbances in vortex formation have a much smaller influence than with sensors detecting vortices in punctiform manner.

Another advantage is that the basic concept of the vortex body according to the invention can be modified and adapted to the particular needs. It is in particular possible for the slots or recesses, e.g. milled recesses formed in both longitudinal sides of the vortex body to be adapted to the particular requirements as regards depth, width and profile and to select the measurement sensitivity, natural resonance and robustness of the vortex flowmeter.

Inexpensive manufacture is in particular made possible by the one-piece construction of the vortex body. Other advantages are a relatively uncomplicated, inexpensive construction, as well as good reproducibility of the detection characteristics due to the sensor-system being received in gastight manner in the vortex body. As the sensor or sensors are isolated from the medium to be measured and are integrated in the vortex body, the risk of destruction or damage by contamination of the medium to be measured, high pressure, high temperature or high flow rate are virtually excluded.

The particularly simple construction of the inventive vortex body also allows a chip machining and the use of both metallic and nonmetallic materials. Other advantage are a largely maintenance-free operation, usability in high pressure and high temperature areas and measurements of media with high and in particular low densities as well as for low flow rates or volume flows with Reynolds numbers ≦ 10,000. Transducers with two sensors can be used with advantage where calibration is required.

BRIEF DESCRIPTION OF THE DRAWINGS

The invention is described in greater detail hereinafter relative to embodiments and the attached drawings, wherein show.

DETAILED DESCRIPTION OF THE DRAWINGS

Figure 1:
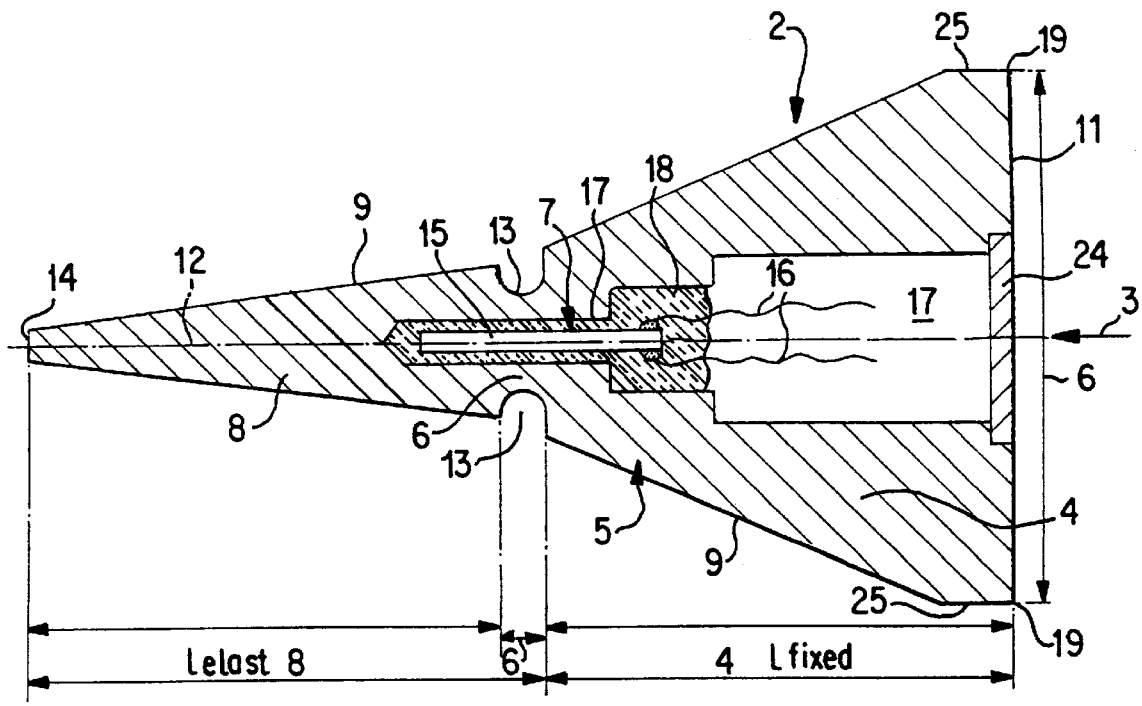
FIG. 1 A horizontal cross-section through a first variant of a baffle barrier for an inventive transducer.
Figure 2:
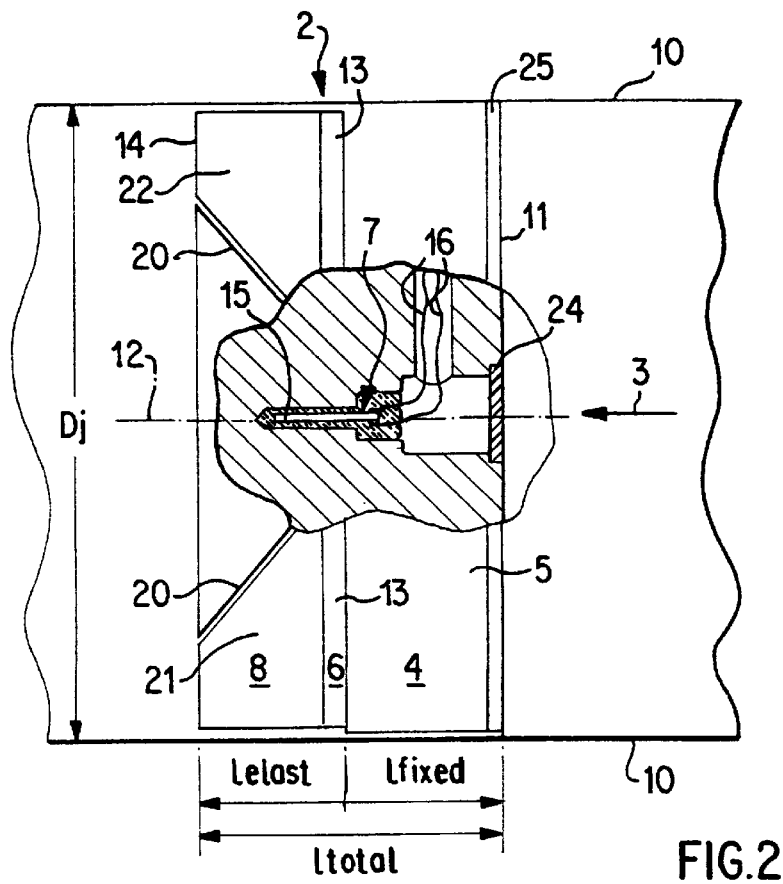
FIG. 2 A part sectional side view of the transducer of FIG. 1.

FIGS. 1 and 2 show a first variant of a transducer 2 according to the invention with a vortex body 5 and a sensor 7 integrated into the latter. In horizontal cross-section the vortex body 5 is virtually triangular or trapezoidal and has in the flow direction according to arrow 3 a first area in the form of a vortex generation area 4, a second area in the form of a vortex detection area 6 and a third area in the form of a vortex determination area 8.

As can be gathered from FIG. 1, the vortex generation area 4 extends from a leading side 11 to a recess 13, which is constructed in a central region of the vortex body 5 in both longitudinal sides 9 and symmetrically to a longitudinal axis 12. As a result of the arrangement and construction, e.g. depth and radius of an arcuate recess 13, it is possible to predetermine the measurement sensitivity and natural resonance of the transducer 2 in accordance with the particular requirements In their longitudinal side extension, the recesses 13 form a mimimum rigidity area An optimum measurement signal acquisition can be brought about by placing the sensor 7 in said area 6.

The vortex determination area 8 extends from the recesses 13 to a rear end 14. FIG. 1 makes it clear that the vortex generation area 4 is particularly compact and robust, whereas the vortex determination area 8 is elastic and oscillatable due to its limited width.

On its longitudinal sides 9, the vortex body 5 has separating edges 19, which in the case of a flow around the same on both sides of the vortex body 5 generate alternating vortices, which in the direction of the vortex determination area 8 form a vortex street. The separating vortices pass along the vortex determination area 8 and induce alternating compressive loads, whose frequecy is dependent on the flow rate of the medium to be detected.

A determination of the oscillations of the vortex determination area 8 takes place with the sensor 7. This sensor 7 is made from a suitable piezoelectric element and is fixed in a bore 17 in such a way that there is a transmission of the vortex frequency determined by the vortex determination area 8 to the sensor 7. The piezoelectric element 15 is appropriately received in a sealing compound 18 and is surrounded on all sides by the latter. The sealing compound 18 can e.g. be constituted by epoxy resins, ceramic adhesives, cement and other adhesives, said sealing compounds permitting a detachable arrangement of the piezoelectric element 15. The piezoelectric element 15, e.g. a plate-like lithium niobate monocrystal or a barium titanate element, on deformation due to the oscillations of the vortex determination area 8, supplies an alternating current voltage across contacted lines 16, whose frequency is proportional to the flow rate of the medium to be measured.

As a result of the one-piece construction of the vortex body 5, the step-like tapering bore 17 can be constructed from the leading side 11 firstly in the vortex generating area 4 and then via the vortex detection area 6 into the vortex determination area 8. The bore 17 is closed by a stopper 24 in the area of the leading side 11, which forms the end face of the vortex generating area 4. In addition to the stopper 24, it is possible to provide further, not shown insulating plates for a particularly gastight closure.

FIGS. 1 and 2 illustrate the construction of the longitudinal side recesses 13, which can in particular be in the form of milled recesses. It can also be seen that the recess 13 extends over the entire height of the longitudinal sides 9. The recesses 13 and longitudinal sides 9 tapering to the rear side 14 are constructed strictly symmetrically in order to avoid measured value falsifications. An extended vortex determination area 8 is obtained if the angle between each longitudinal side 9 and a parallel to the leading side 11 is made larger than in the vortex generating area 4.

Advantageously a vortex body 5 is constructed with respect to an aspect ratio of the vortex generation area 4 to the entire elastic part, i.e. to the vortex detection area 6 and vortex determination area 8, in the ranges $$l_{fixed}=0.3-0.6 \times l_{tot} \text{ and/or}$$

$$l_{elast}=0.4-0.7 \times l_{tot}$$

The ratio of the vortex body width b to the internal diameter $D_i$ of a measuring tube 10 (FIG. 2) should be appropriately $b:D_i=0.2-0.35$. The ratio of the vortex body length l in the flow direction and vortex body width b can be $l:b=1.2-1.9$.

FIGS. 1 and 2 show a separating edge area 25, which is at right angles to the leading side 11. Only following this separating edge area 25 do the longitudinal sides 9 taper in the direction of the recesses 13 and rear side 14 accompanied by the formation of a trapezoidal vortex generating area 4 and vortex determination area 8, between which the vortex detection area 6 is formed by the recesses 13.

As can be gathered from FIG. 2, the vortex determination area 8 extends over virtually the entire tube diameter $D_i$. Indentations 20, which in the variant according to FIG. 2 are at about 45° to the longitudinal axis 12 of the measuring tube 10 ensure a decoupling of disturbing marginal influences of the flow in the vortex determination area 8. Simultaneously through the indentations 20 at an angle to the longitudinal axis 12 it is possible to influence the measuring sensitivity by concentrating the force action of the vortex determination area 8 to the immediate area of the sensor 7 and optimize the same. As a result of the indentations 20, which can extend from the rear side 14 to the vortex detection area 6, the vortex determination area 8 is divided into three. The external, decoupled areas 21, 22 bring about a flow, such that the quality of the vortex street form is not influenced.

It is appropriate to choose the width of the indentations 20 as a function of the nominal width of the measuring tube 10. Generally the width of the indentation 20 is 0.005 to $0.002 \times D_i$ (internal diameter of the measuring tube 10).

Figure 7:
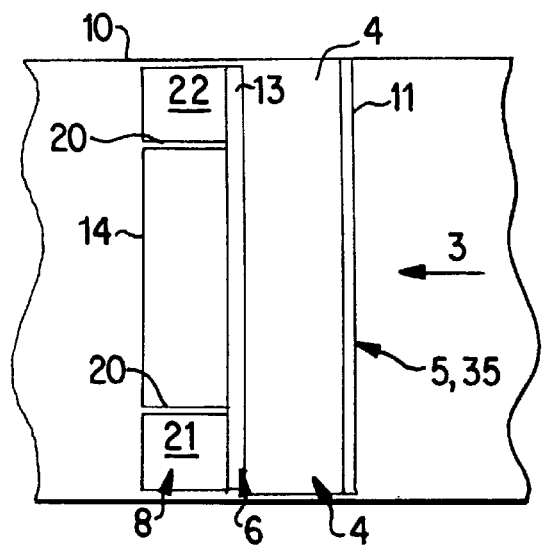
FIG. 7 A fifth variant of an inventive transducer.

FIG. 7 shows an alternative arrangement of indentations 20 in a vortex determination area 8. The indentations 20 are made from a rear side 14 parallel to the walls of the measuring tube 10 and extending up to the vortex detection area 6. These parallel indentations 20 also bring about a decoupling of disturbing marginal influences, particularly of the tube inner wall. The flow is so guided by the two decoupled areas 21, 22, that the quality of the vortex street formed is not influenced.

Figure 6:
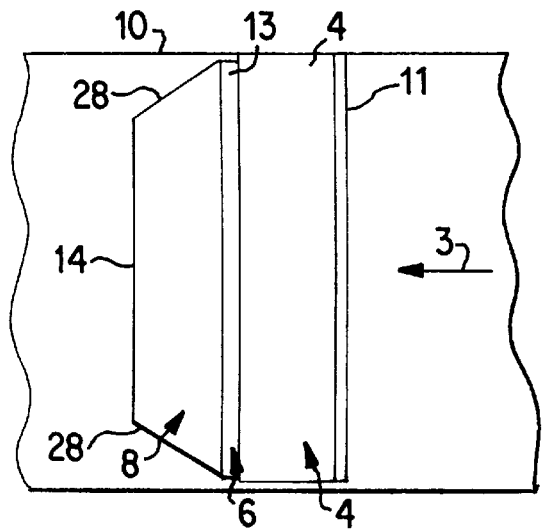
FIG. 6 A side view of a fourth variant of an inventive transducer.

FIG. 6 highly diagrammatically shows a vortex body 5 with a vortex determination area 8, which is bevelled towards the vortex detection area 6. This construction is also intended to prevent disturbing influences of the walls of the measuring tube 10. As in the preceding drawings, the vortex body 5 has a not shown sensor, a separating edge area 25 and recesses 13 in the longitudinal sides 9.

Figure 3:
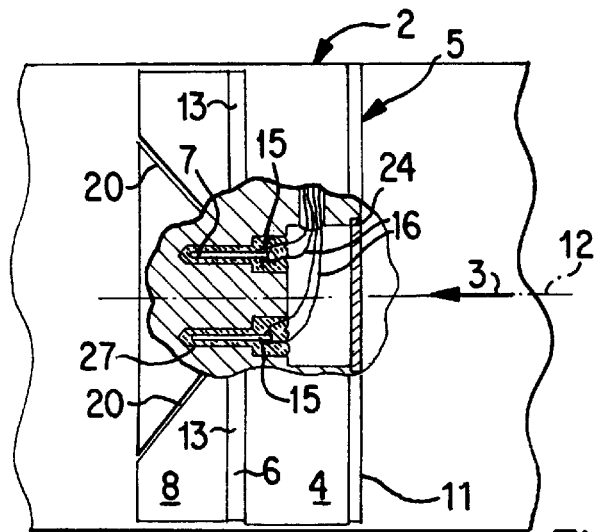
FIG. 3 A part sectional side view of a second variant of a transducer according to the invention with two sensors.

With regards to the construction of the vortex body 5, the transducer 2 according to FIG. 3 corresponds to the transducer 2 shown in FIGS. 1 and 2. Once again the transducer 2 of FIG. 3 is in one piece and consequently has no difficult to reproduce welds and joints or connecting elements which, because they are in the immediate vicinity of the sensor, decisively influence the reproducibility of detection characteristics of the sensor system. The transducer 2 according to FIG. 3 has an increased functional reliability, because two sensors 7, 27 are provided. As a result of this redundant arrangement, two identical output signals are obtained. This makes it possible to detect problems or interferences and also to use the overall system where calibration is necessary. The two sensors 7, 27 are superimposed and symmetrical to the longitudinal axis 12 of the transducer 2. As in FIG. 2, the lines 16 contacted with the piezoelectric elements 15 are led to a not shown measured value determining means. The further essential features, particularly the bilateral recesses 13 in the longitudinal sides 9 and the angled indentations 20 in the vortex determination area 8 correspond to FIGS. 1 and 2, so that reference should be made to the preceding embodiment concerning the explanation of these features carrying identical reference numerals.

Figure 4:
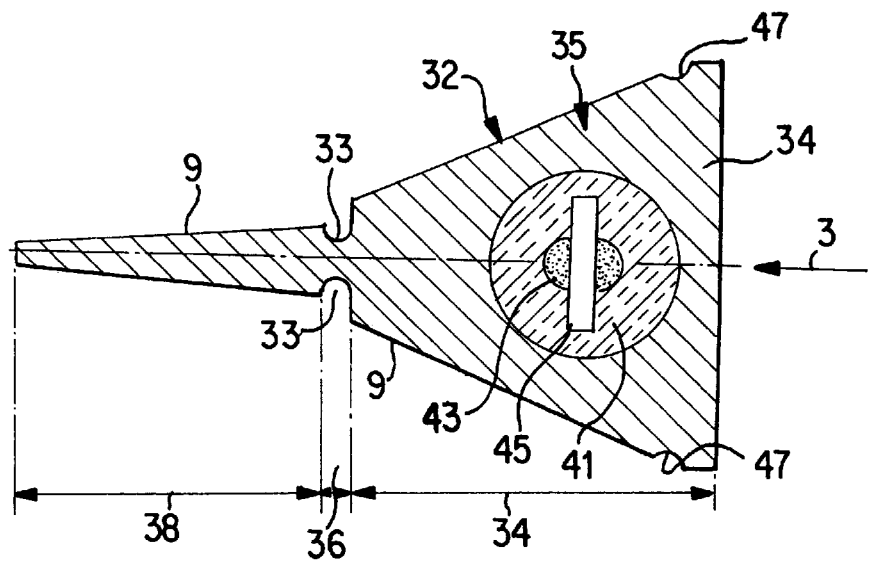
FIG. 4 A horizontal cross-section through a third variant of a transducer according to the invention.
Figure 5:
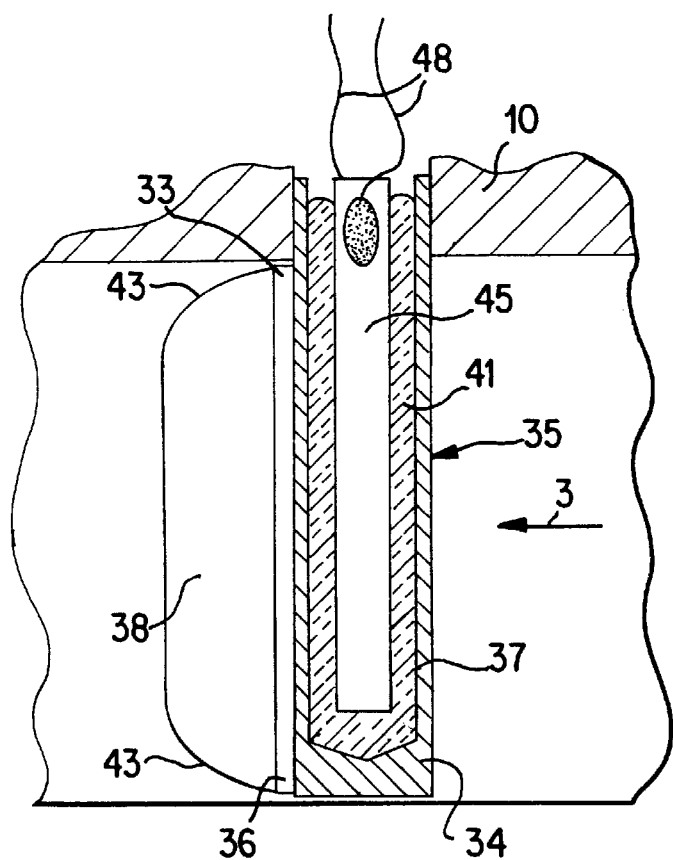
FIG. 5 A part sectional side view of the transducer of FIG. 4.

The transducer 32 according to FIGS. 4 and 5 is intended for nominal widths DN 10 to 40. Unlike in the case of the nominal width DN 50 to 300 (FIGS. 1 to 3), it is not possible for dimensional reasons to place a sensor in the vortex detection area 36. Therefore a piezoelectric element 45 is positioned in the perpendicular longitudinal direction in the vortex generation area 34. This vortex generation area 34 unlike a vortex detection area 36 formed by recesses 33 and a vortex determination area 38 is relatively compact and stable.

FIG. 5 shows a sensor 45 made of a plate-like piezoelectric element as a sensor 45 and which is fixed in a bore 37 with the aid of a sealing compound 41 in such a way that there is a backlash-free transmission of the vortex frequency to the sensor 45. With the sealing compound 41 and bore 37 the sensor 45 extends into a tube wall 10, which has a corresponding opening. Two lines 48 contacted with the sensor 45 pass the signal contained in said sensor 45 out of the transducer 32.

A vortex determination area 38 is logarithmically constructed over the cross-section for adapting to the velocity profile of the measuring medium. This gives a rounded or dished end region 43 of the elastic vortex determination area 38. The influence of disturbances from the tube wall area of the flow on the measurement signal can be reduced through said end regions 43. In addition, the rounded end regions 43 have a flow guidance function.

A further influencing of vortex formation can be achieved by recesses, shaped or milled slots directly in the vortex generation area (FIG. 4). Such additional milled slots 47 virtually parallel to the recesses 13 of the vortex detection area 36 and favour the vortex formation and linearity zone of the transducer. Preferably said milled slots are rounded and formed at or close to the separating edges.

I claim:

1. Transducer for a vortex flowmeter comprising:
    a vortex body formed in a one-piece manner, having a virtually triangular or trapezoidal cross-section, and including vertical recesses in longitudinal sides thereof, said recesses forming a vortex detection area which is positioned between a vortex generation area and a vortex determination area, and
    at least one sensor for detecting measuring signals at least close to the vortex detection area and integrated within the vortex body,
    the vortex body, in a flow direction, having a defined ratio of length of a vortex generation area to an elastic area including the vortex detection area and the vortex determination area, said vortex body having a total length ($1_{tot}$) dimensioned in such a way that the compact vortex generation area has a length in a range of from $0.3 \times 1_{tot}$ to $0.6 \times 1_{tot}$ and the vortex determination area and the vortex detecting area as elastic areas have a length in a range of from $0.4 \times 1_{tot}$ to $0.7 \times 1_{tot}$, said vortex generation area of the vortex body having a separating edge area which is oriented at right angles to the leading side of the vortex body, wherein, following the separating edge area, the longitudinal sides are tapered in a direction of the recesses of the vortex detection area by formation of a first angle relative to the leading side, and wherein, following the recesses of the vortex detection area, the longitudinal sides are tapered by formation of a second angle relative to the leading side, the second angle being larger than the first angle.

2. Transducer according to claim 1, wherein, at said leading side, the vortex body has a vortex body width b and is dimensioned so that a ratio of the vortex body length 1 to the vortex body width b is in the range of from 1.2 to 1.9.

3. Transducer according to claim 2, wherein said recesses are shaped symmetrically, pass virtually at right angles relative to the longitudinal axis, and form a narrow bending area, said recesses having depths, widths, forms of profile, and arrangement of the recesses making it possible to determine measuring sensitivity, natural resonance and robustness of the vortex flowmeter.

4. Transducer according to claim 3, wherein said recesses are formed as milled slots in a vortex body made of metal or plastic material.

5. Transducer according to claim 3, wherein said vortex body can be fixed on at least one side by any of welding, screwing, shrinking in, pinning, and bonding in a measuring tube and fixing of the vortex body can take place in conjunction with suitable sealing elements.

6. Transducer according to claim 2, wherein said vortex body is dimensioned so that a ratio of the vortex body width to an internal diameter of a measuring tube into which the vortex body is inserted is 0.2 to 0.35.

7. Transducer according to claim 2, wherein said vortex body has milled slots between said separating edge area and the longitudinal sides.

8. Transducer according to claim 1, wherein said vortex determination area of the vortex body is formed at the rear side of said vortex body and is provided with bevels, said bevels emanating from the vortex detection area and passing accompanied by tapering to the rear side of the vortex body.

9. Transducer according to claim 8, wherein said vortex determination area has indentations emanating from the rear side of the vortex body and extending to the recesses of the vortex detection area, and wherein the width of the indentations can be adapted to the nominal width of the vortex flowmeter.

10. Transducer according to claim 9, wherein said indentations are symmetrical and parallel to the longitudinal axis of the vortex body.

11. Transducer according to claim 9, wherein said indentations are bevelled with respect to the longitudinal axis of the vortex body.

12. Transducer according to claim 1, wherein said sensor includes a piezoelectric element placed in the vortex detection area, said piezoelectric element extending virtually equally into the vortex generation area and the vortex determination area.

13. Transducer according to claim 1, wherein said at least one sensor is one of two sensors integrated into the vortex body, said two sensors being placed symmetrically relative to a longitudinal axis of the transducer.

14. Transducer according to claim 13, wherein said two sensors include an isolated sensor which is isolated from the medium to be measured in a gastight manner in the vortex body, and wherein, as said sensor, any of a plate-like lithium niobate monocrystal, a barium titanate element, and a comparable piezoelectric element is used, said sensor being detachably placed in a sealing compound.

15. Transducer according to claim 1, wherein said sensor is oriented vertically in the vortex generation area and adjacent the vortex detection area.

16. Transducer according to claim 1, wherein said vortex determination area of the vortex body is formed at the rear side of said vortex body and is provided with rounded end regions.

* * * * *